US006285277B1

(12) United States Patent
Owen

(10) Patent No.: US 6,285,277 B1
(45) Date of Patent: Sep. 4, 2001

(54) PAGE SIMULATING DEVICE

(76) Inventor: Suzanne M. Owen, 28 Hastings LN, Boynton Beach, FL (US) 33426

( * ) Notice: Subject to any disclaimer, the term of this patent is extended or adjusted under 35 U.S.C. 154(b) by 0 days.

(21) Appl. No.: 09/612,036

(22) Filed: Jul. 7, 2000

(51) Int. Cl.[7] .................................................... H04Q 1/30

(52) U.S. Cl. ................................... 340/311.2; 340/309.4; 340/328

(58) Field of Search ................................ 340/311.2, 328, 340/825.44, 539, 309.15, 309.3, 309.4, 384.71; 381/79, 82; 206/534

(56) References Cited

U.S. PATENT DOCUMENTS

| | | | |
|---|---|---|---|
| D. 248,759 | 8/1978 | Eckmann et al. | D14/191 |
| D. 348,463 | 7/1994 | Scheid et al. | D14/191 |
| 4,633,232 | 12/1986 | Nelson et al. | 340/542 |
| 5,105,189 | 4/1992 | Murai et al. | 337/319 |
| 5,429,301 | 7/1995 | Franks | 239/1 |
| 5,739,748 * | 4/1998 | Flick | 340/426 |
| 5,764,131 | 6/1998 | Twining et al. | 340/311.2 |
| 5,915,558 * | 6/1999 | Givertz | 206/534 |

* cited by examiner

*Primary Examiner*—Van T. Trieu

(57) ABSTRACT

A page simulating device for simulating a page for a user. The page simulating device includes a housing resembling a pager apparatus and a circuit for producing an audible sound upon actuation of the circuit. The housing has an activation button mounted thereon. The housing includes a display mounted thereon. The display is adapted to display alpha-numeric characters. The circuit is actuated by depression of the activation button mounted on the housing. The circuit is to produce the audible sound through a sound producing means.

15 Claims, 4 Drawing Sheets

PAGE SIMULATING DEVICE

BACKGROUND OF THE INVENTION

1. Field of the Invention

The present invention relates to pager simulation devices and more particularly pertains to a new page simulating device for simulating a page for a user.

2. Description of the Prior Art

The use of pager simulation devices is known in the prior art. More specifically, pager simulation devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,764,131; U.S. Pat. No. 5,429,301; U.S. Pat. No. Des. 248,759; U.S. Pat. No. 5,105,189; U.S. Pat. No. 4,633,232; and U.S. Pat. No. Des. 348,463.

While these devices fulfill their respective, particular objectives and requirements, the aforementioned patents do not disclose a new page simulating device. The inventive device includes a housing resembling a pager apparatus and a circuit for producing an audible sound upon actuation of the circuit. The housing has an activation button mounted thereon. The housing includes a display mounted thereon. The display is adapted to display alphanumeric characters. The circuit is actuated by depression of the activation button mounted on the housing. The circuit is to produce the audible sound through a sound producing means.

In these respects, the page simulating device according to the present invention substantially departs from the conventional concepts and designs of the prior art, and in so doing provides an apparatus primarily developed for the purpose of simulating a page for a user.

SUMMARY OF THE INVENTION

In view of the foregoing disadvantages inherent in the known types of pager simulation devices now present in the prior art, the present invention provides a new page simulating device construction wherein the same can be utilized for simulating a page for a user.

The general purpose of the present invention, which will be described subsequently in greater detail, is to provide a new page simulating device apparatus and method which has many of the advantages of the pager simulation devices mentioned heretofore and many novel features that result in a new page simulating device which is not anticipated, rendered obvious, suggested, or even implied by any of the prior art pager simulation devices, either alone or in any combination thereof.

To attain this, the present invention generally comprises a housing resembling a pager apparatus and a circuit for producing an audible sound upon actuation of the circuit. The housing has an activation button mounted thereon. The housing includes a display mounted thereon. The display is adapted to display alphanumeric characters. The circuit is actuated by depression of the activation button mounted on the housing. The circuit is to produce the audible sound through a sound producing means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new page simulating device apparatus which has many of the advantages of the pager simulation devices mentioned heretofore and many novel features that result in a new page simulating device which is not anticipated, rendered obvious, suggested, or even implied by any of the prior art pager simulation devices, either alone or in any combination thereof.

It is another object of the present invention to provide a new page simulating device, which may be easily and efficiently manufactured and marketed.

It is a further object of the present invention to provide a new page simulating device, which is of a durable and reliable construction.

An even further object of the present invention is to provide a new page simulating device which is susceptible of a low cost of manufacture with regard to both materials and labor, and which accordingly is then susceptible of low prices of sale to the consuming public, thereby making such page simulating device economically available to the buying public.

Still yet another object of the present invention is to provide a new page simulating device which provides in the apparatuses of the prior art some of the advantages thereof, while simultaneously overcoming some of the disadvantages normally associated therewith.

Still another object of the present invention is to provide a new page simulating device for simulating a page for a user.

Yet another object of the present invention is to provide a new page simulating device which includes a housing resembling a pager apparatus and a circuit for producing an audible sound upon actuation of the circuit. The housing has an activation button mounted thereon. The housing includes a display mounted thereon. The display is adapted to display alphanumeric characters. The circuit is actuated by depression of the activation button mounted on the housing. The circuit is to produce the audible sound through a sound producing means.

Still yet another object of the present invention is to provide new page simulating device that provides a user with a tactful means of ending a conversation with another person.

Even still another object of the present invention is to provide a new page simulating device that may effectively be used to provide a user with the means for simulating an unexpected page to permit the user to excuse himself or herself from an undesireable situation on the pretext of responding to the page.

Even still another object of the present invention is to provide a new page simulating device that may be used as a means of gathering the attention of others from a user who may be physically or otherwise unable to make any audible noise.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
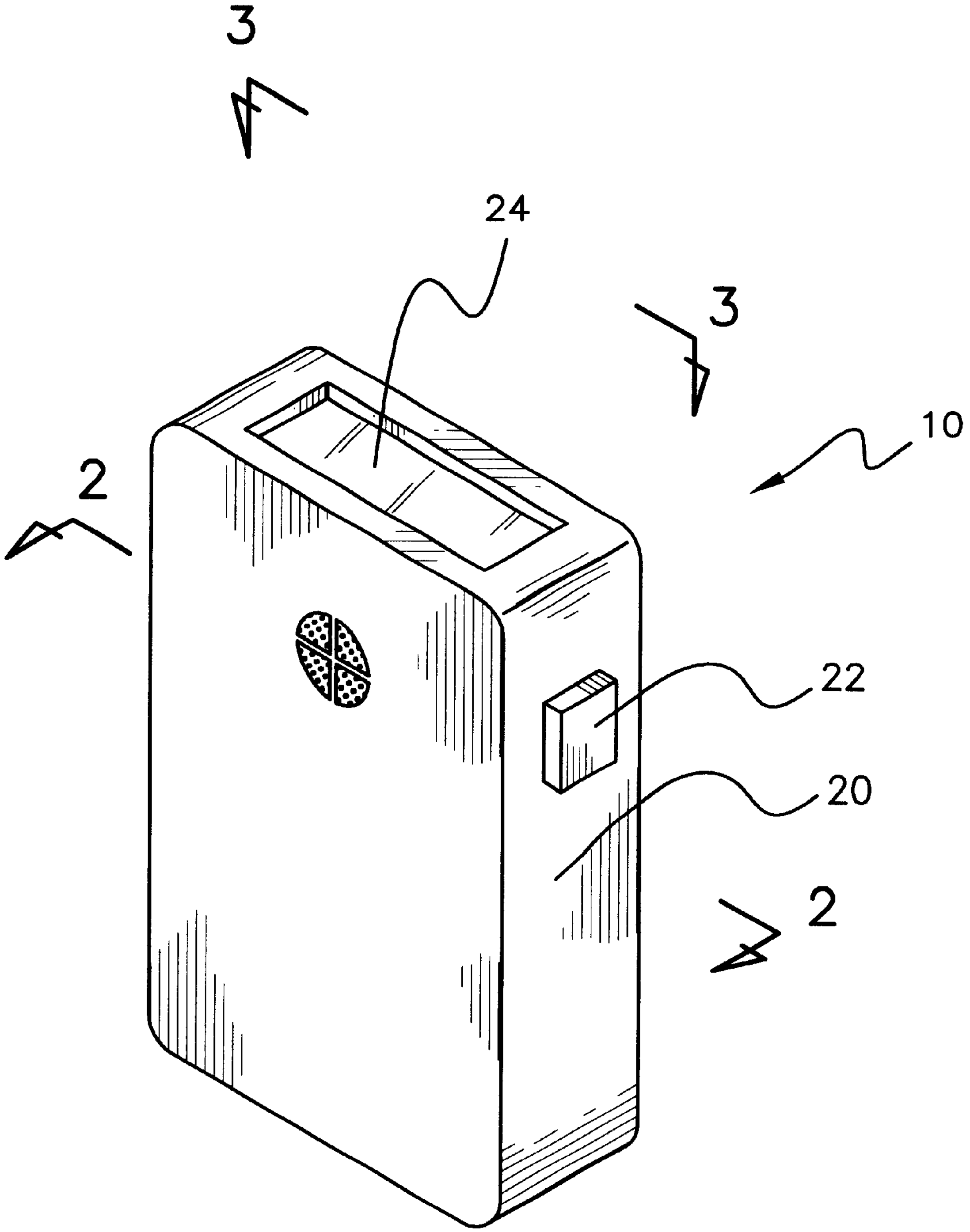
FIG. 1 is a schematic perspective view of a new page simulating device according to the present invention.
Figure 2:
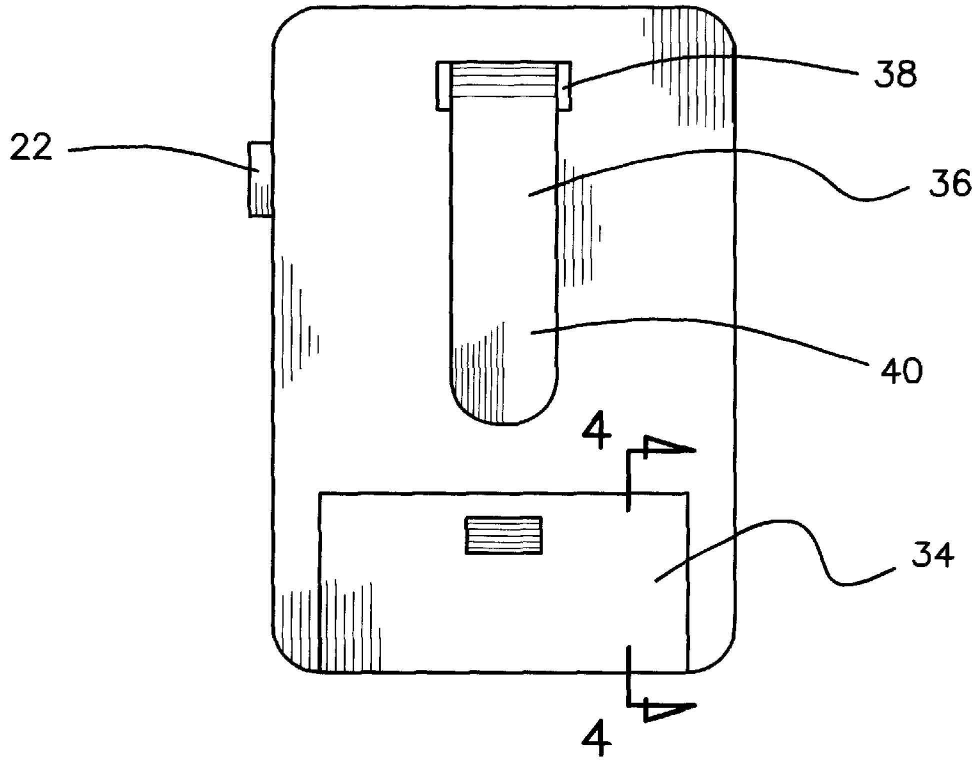
FIG. 2 is a schematic back view of the present invention.
Figure 3:
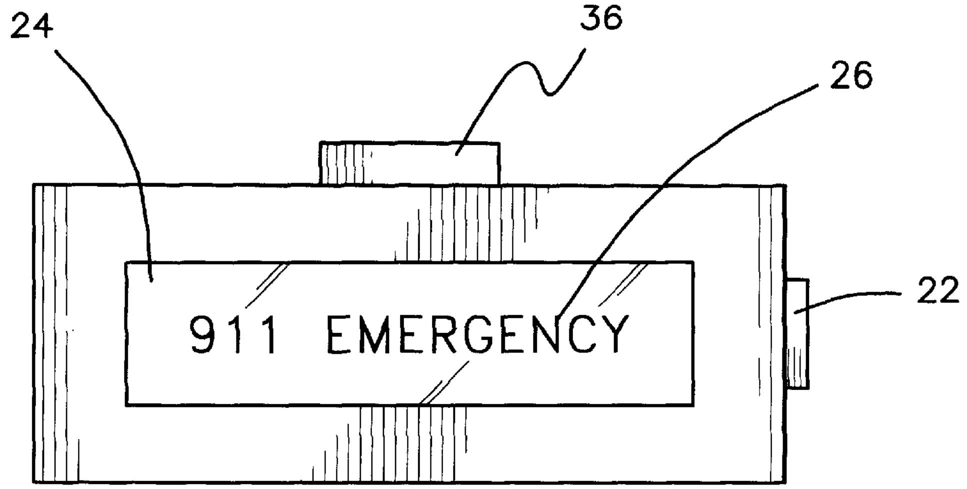
FIG. 3 is a schematic top view of the present invention taken along line 3—3 of FIG. 1.
Figure 4:
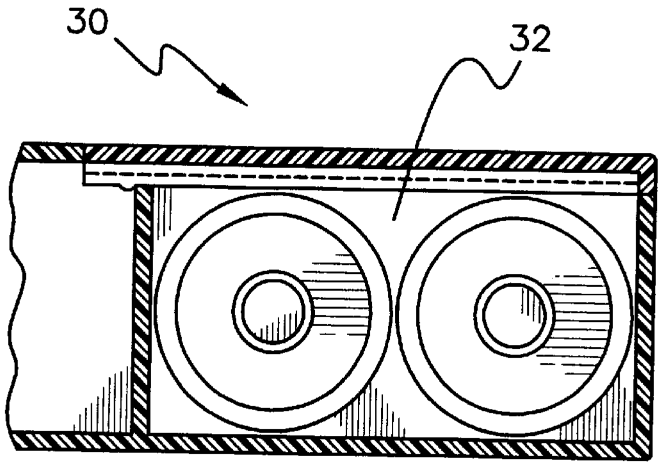
FIG. 4 is a schematic sectional side view of the present invention taken along line 4—4 of FIG. 2 and illustrating the battery compartment of the invention.
Figure 5:
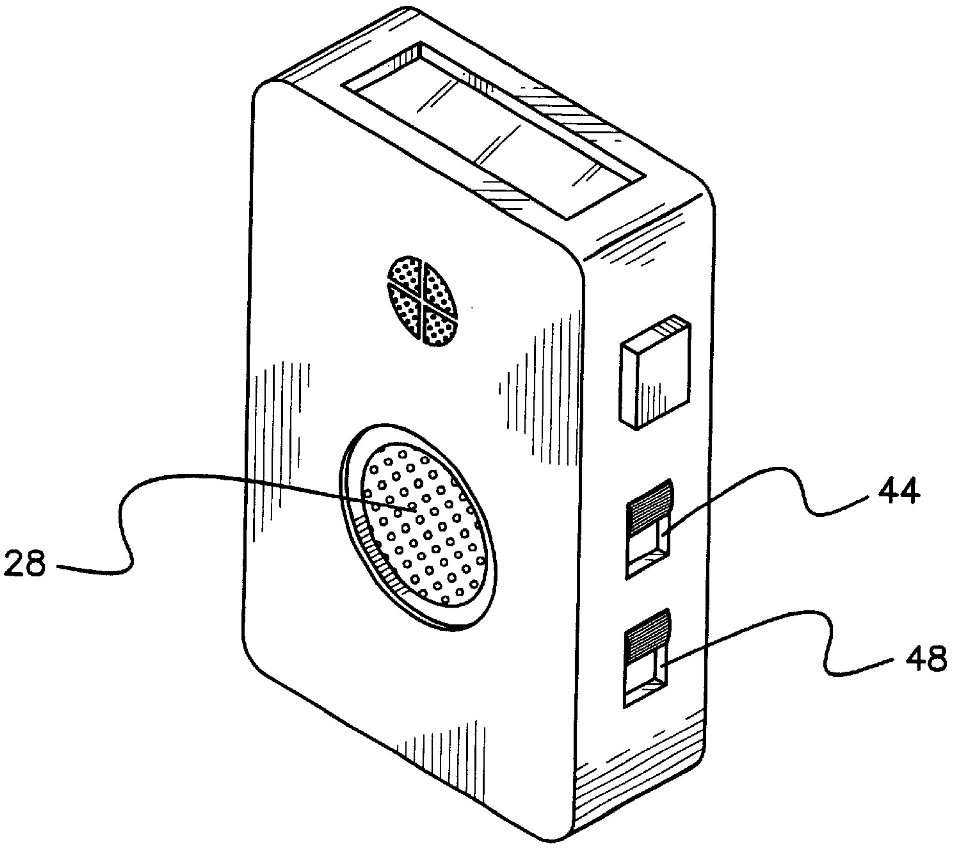
FIG. 5 is a schematic perspective view of another embodiment of the present invention.
Figure 6:
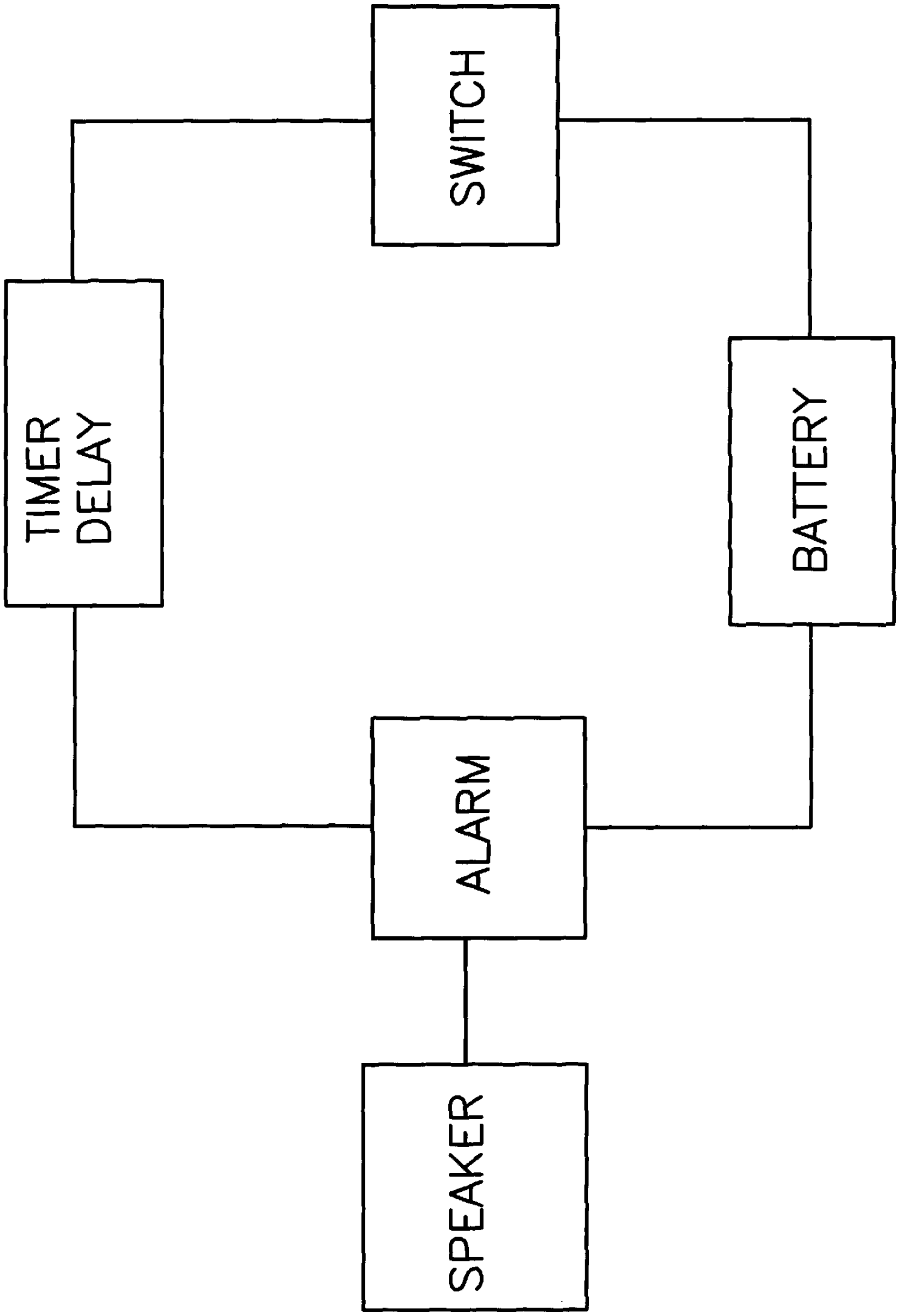
FIG. 6 is a schematic perspective view of the circuit for producing an audible sound.

With reference now to the drawings, and in particular to FIGS. 1 through 5 thereof, a new page simulating device embodying the principles and concepts of the present invention and generally designated by the reference numeral 10 will be described.

As best illustrated in FIGS. 1 through 5, the page simulating device 10 generally comprises a housing 20 resembling a pager apparatus and a circuit for producing an audible sound upon actuation of the circuit.

The housing 20 includes an activation button 22 mounted thereon. The housing 20 is includes a display 24 mounted thereon. The display 24 is adapted to display alphanumeric characters 26. In one embodiment of the invention, the display may read a simulated telephone number with the digits "911" printed at the end of the simulated number.

The housing 20 has a sound producing means mounted thereon or producing an audible sound. An aperture 28 is formed in a wall of the housing 20. The aperture 28 is positioned in front of the sound producing means.

The housing 20 may have a battery compartment 30. The battery compartment 30 comprises a recess 32 in the housing 20. The battery compartment 30 includes a cover 34 removably mounted on the housing 20. The cover 34 is designed for covering the recess 32 of the battery compartment 30.

A clip 36 may be mounted on the housing 20. The clip 36 has a base end 38 mounted on the rear wall and a free end 40 portion. The free end 40 portion extends substantially parallel to a rear wall 42 of the housing 20. The clip is adapted to be selectively attached to an article of apparel of a user.

The housing 20 has a power switch 44. The power switch 44 is mounted on the housing 20. The power switch 44 comprises a slide switch 48 mounted on a side wall of the housing 20.

The circuit is actuated by depression of the activation button 22 mounted on the housing 20. The circuit is adapted to produce the audible sound through the sound producing means. Preferably, the circuit is adapted to produce the audible sound within a predetermined time period after depression of the activation button 22. The permits the user to activate the circuit a period of time well before the audible sound is emitted so as to reduce any suspicion that the user (and not a remote person) has initiated the emission of the audible sound.

In one embodiment of the invention, the predetermined time period may be adjustable. The predetermined time period may be adjustable between 2, 5, and 10 minutes. Preferably, the housing 20 includes a slide switch for controlling the predetermined time period.

Ideally, the circuit includes a panic alarm system for producing a loud audible sound when a panic button is depressed.

The device is not intended to operate as a conventional pager device, and thus, the circuit is incapable of wirelessly transmitting to a remote station. This makes the device much more affordable, as transmitting and receiving circuitry is not needed for the device.

In use, the device is made operational by turning the power switch to an "on" setting. The user may select the amount of time desired to lapse between the activation and the simulated page response. The user depresses the activation button. After the time delay has lapsed, the device will produce an audible sound that simulates the beeping of a pager and may optionally display a simulated telephone number or other numeric message to further simulate a genuine page. In one embodiment of the invention, the user may press the activation button to activate a panic alarm system to produce an immediate and much louder sound to attract attention to the user feeling threatened.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for simulating a page of user, comprising:

a housing resembling a pager apparatus, the housing having an activation button mounted thereon, the housing having a display mounted thereon, the display being adapted to display alphanumeric characters;

a circuit for producing an audible sound upon actuation of the circuit, the circuit being actuated by depression of the activation button mounted on the housing, the circuit being adapted to produce the audible sound through the sound producing means;

wherein the circuit is adapted to produce the audible sound after a preset time period after depression of the activation button; and wherein the preset time period is adjustable between at least two time periods.

2. The device of claim 1 wherein the housing has a sound producing means mounted thereon for producing an audible sound.

3. The device of claim 2 wherein an aperture is formed in a wall of the housing and being positioned in front of the sound producing means.

4. The device of claim 1 wherein the housing has a battery compartment.

5. The device of claim 4 wherein the battery compartment comprises a recess in the housing.

6. The device of claim 5 wherein the battery compartment includes a cover removably mounted on the housing for covering the recess of the battery compartment.

7. The device of claim 1 wherein a clip is mounted on the housing for selectively holding the housing on an article of apparel of a user.

8. The device of claim 7 wherein the clip has a base end mounted on a rear wall of the housing and a free end portion extending substantially parallel to the rear wall of the housing.

9. The device of claim 1 wherein the housing has a power switch being mounted on the housing.

10. The device of claim 9 wherein the power switch comprises a slide switch mounted on a side wall of the housing.

11. The device of claim 1, wherein the preset time period is adjustable between 2, 5, and 10 minutes.

12. The device of claim 11 wherein the housing includes a slide switch for controlling the preset time period.

13. The device of claim 1 wherein the circuit includes a panic alarm system for producing a loud audible sound when a panic button is depressed.

14. The device of claim 1 wherein the circuit is capable of wirelessly transmitting to a remote station.

15. A device for simulating a page of user, comprising:

a housing resembling a pager apparatus, the housing having an activation button mounted thereon, the housing having a display mounted thereon, the display being adapted to display alphanumeric characters;

wherein the housing has a sound producing means mounted thereon for producing an audible sound, an aperture being formed in a wall of the housing and being positioned in front of the sound producing means;

wherein the housing has a battery compartment, the battery compartment comprising a recess in the housing, the battery compartment including a cover removably mounted on the housing for covering the recess of the battery compartment;

wherein a clip is mounted on the housing, the clip having a base end mounted on a rear wall of the housing and a free end portion extending substantially parallel to the rear wall of the housing;

wherein the housing has a power switch is mounted on the housing, the power switch comprising a slide switch mounted on a side wall of the housing;

a circuit for producing an audible sound upon actuation of the circuit, the circuit being actuated by depression of the activation button mounted on the housing, the circuit being adapted to produce the audible sound through the sound producing means;

wherein the circuit is adapted to produce the audible sound after a preset time period after depression of the activation button;

wherein the preset time period is adjustable between at least two time periods, wherein the preset time period is adjustable between 2, 5, and 10 minutes, the housing including a slide switch for controlling the preset time period;

wherein the circuit includes a panic alarm system for producing a loud audible sound when a panic button is depressed;

wherein the circuit is capable of wirelessly transmitting to a remote station.

* * * * *